United States Patent
More et al.

(10) Patent No.: US 6,591,287 B1
(45) Date of Patent: Jul. 8, 2003

(54) METHOD TO INCREASE THE EFFICIENCY OF JOB SEQUENCING FROM SEQUENTIAL STORAGE

(75) Inventors: Sachin S. More, Marlborough, MA (US); Shanmugavelayut Muthukrishnan, Washington, DC (US); Elizabeth Shriver, Jersey City, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/391,470

(22) Filed: Sep. 8, 1999

(51) Int. Cl.$^7$ .............. G06F 9/00; G06F 15/16; G06F 19/00
(52) U.S. Cl. ............ 709/102; 709/104; 709/107; 709/103; 709/219; 700/100; 700/104
(58) Field of Search .................. 709/102, 105, 709/107; 711/138; 714/15

(56) References Cited

U.S. PATENT DOCUMENTS

| | | | | |
|---|---|---|---|---|
| 5,325,526 A | * | 6/1994 | Cameron et al. | 709/102 |
| 5,349,656 A | * | 9/1994 | Kaneko et al. | 709/102 |
| 5,392,430 A | * | 2/1995 | Chen et al. | 707/3 |
| 5,437,032 A | * | 7/1995 | Wolf et al. | 709/103 |
| 5,504,881 A | * | 4/1996 | Sirurget | 714/38 |
| 5,596,707 A | * | 1/1997 | Ohta | 714/6 |
| 5,671,350 A | * | 9/1997 | Wood | 714/15 |
| 5,729,718 A | * | 3/1998 | Au | 360/48 |
| 5,797,000 A | * | 8/1998 | Bhattacharya et al. | 707/2 |
| 5,822,207 A | * | 10/1998 | Hazama et al. | 700/104 |
| 5,870,553 A | * | 2/1999 | Shaw et al. | 709/219 |
| 5,914,916 A | * | 6/1999 | Totsuka et al. | 369/30.1 |
| 5,918,243 A | * | 6/1999 | Giordano et al. | 711/112 |
| 6,055,559 A | * | 4/2000 | Shimizu et al. | 709/107 |
| 6,272,565 B1 | * | 8/2001 | Lamberts | 710/43 |
| 6,279,082 B1 | * | 8/2001 | Rosendahl et al. | 711/138 |
| 6,321,133 B1 | * | 11/2001 | Smirnov et al. | 700/100 |

OTHER PUBLICATIONS

S. M. Johnson, "Optimal Two– and Three–Stage Production Schedules with Setup Times Included," Naval Research Logistics Quarterly, Mar. 1954, pp. 61–68.
Garey and Johnson, "Computers and Intractability: A Guide to the Theory of NP–Completeness," Appendix: A List of NP–Completeness Problems, pp. 187–244.

* cited by examiner

Primary Examiner—Ayaz Sheikh
Assistant Examiner—Christian La Forgia (57) ABSTRACT

A method and apparatus for scheduling jobs having a staging time and a processing time are described. In one method, the jobs are divided into subsets based on a predetermined criteria such as depending on whether the staging time is longer than the processing time. In this method, the jobs in each subset are ordered independently. The jobs are then scheduled by alternating between the ordered subsets. In a second method, the jobs are again divided into subsets based on a predetermined criteria such as depending on whether the staging time is longer than the processing time. The jobs in each subset are ordered independently. The jobs in one subset are then simply appended to the other subset. In a third method, the jobs are ordered according to a predetermined criterion into a list and are executed by alternating between both ends of the list. The invention is also applicable to scheduling jobs having a destaging time. In this case, the staging time is set equal to the staging time plus the processing time and the processing time is set equal to the processing time plus the destaging time. The jobs are then scheduled according to the second method discussed above.

29 Claims, 4 Drawing Sheets

METHOD TO INCREASE THE EFFICIENCY OF JOB SEQUENCING FROM SEQUENTIAL STORAGE

BACKGROUND OF THE INVENTION

1. Field of the Invention

The present invention relates generally to the field of scheduling tasks, and more particularly to scheduling tasks involving varying staging, processing, and destaging times.

2. Description of the Related Art

The invention has particular applicability to data processing in contexts where the data to be processed is stored on a media such as tape that is accessed sequentially rather than randomly and therefore may involve significant staging times (the time required to access the data and/or place the data in a temporary storage medium where it may be accessed quickly during processing) as well as processing times. Therefore, the invention will be discussed in connection with data processing tasks (referred to herein as "jobs"), wherein the data is stored on tape. However, the invention is not limited to these contexts and may be used to schedule a wide variety of jobs, including jobs that do not involve a computer in any way as well as computer-related jobs regardless of whether the data is stored on tape.

Many data repositories are or are expected to become huge, possibly terabytes or petabytes in size. Given the current mass storage technology, these data will almost certainly reside on tapes. Even when expected increases in disk capacity are considered, sizeable portions of these repositories are likely to be on tape media. Analyzing, mining, and other data-intensive applications thus comprise tape-resident jobs, that is, jobs that process wholly, or in part, data from tape.

One tape-resident job application scenario of note is EOSDIS (Earth Observing System Data and Information System). EOSDIS will command and control a series of 10 observation satellites, and provide distributed data processing, archival, and distribution across eight DAACs (Distributed Active Archive Centers). Each DAAC consists of a set of processors which share disks that are connected to the archival system. The disks are used as a cache. Typical systems include a platform of 16 processors sharing 512 Gbytes of disk space, and up to three platforms sharing 4 tape drives. EOSDIS has been engineered to ensure that these tape drive subsystems are not a performance bottleneck.

The data are processed to yield data products that are stored on an archival set of tapes. About 0.6 terabytes of data will be collected daily, with a plan to accumulate a comprehensive global 15-year data set containing several petabytes of data. Data files will be downloaded from the satellites and archived on tape. Periodically, a predetermined batch of jobs will be run on possibly several days worth of data to summarize and analyze the data. The resulting data products allow scientists to study, for example, water vapor, cloud profiles, solar irradiance, etc. Such batches contain jobs which typically have sophisticated access patterns that involve reading files from and writing to several tapes. The jobs have been planned in great detail; the size and number of files, as well as the number of floating point operations needed for each job are known. Nearly five thousand tape-resident jobs are executed per day at the 8 DAACs. These jobs have a large range of needs, with some jobs being processed in just over two minutes, while others require up to 11 days for processing. In nearly 90% of the tape-resident jobs, more time is spent on moving the data to and from tape than is spent processing the data.

A similar scenario arises in data processing at large corporations which are increasingly incorporating bulk "bookkeeping" operations. By bookkeeping, we mean running a batch of basic operations such as collating, summarizing, compressing, and archiving data, and more generally, sophisticated data mining, billing, fraud detection, etc. Such bulk bookkeeping processes are run periodically—say daily, weekly, or monthly—on accumulated "sales data" which maybe too large to be resident on disks.

Many other instances of processing batches of tape-resident jobs exist when massive data sets are manipulated. Spatial data manipulation within Geographic Information Systems (GIS) is another such instance.

A rather natural question arises, namely, how to order the execution of the tape-resident jobs in a given batch. Not all sequences of execution amongst these jobs make optimum use of the resources. For instance, a poor schedule may force processors to be idle when data is read from tape to disk, while a careful scheduler might be able to hide that latency by having scheduled other jobs previously to keep the processors busy. Thus better sequencing strategies may significantly reduce the total time for executing the given batch. Since these batches of jobs typically take a long time to execute (batches of jobs in EOSDIS, for example, may take several hours or in cases where a batch is run once a month, may even take a few days). Thus, decreasing the overall running time by even a small fraction may make a significant difference.

What is needed is a method for efficiently scheduling jobs with varying staging and processing times, such as tape-resident data processing jobs.

SUMMARY OF THE INVENTION

The present invention overcomes the aforementioned limitations of the prior art by providing a plurality of methods for efficiently scheduling jobs with varying staging, destaging, and processing times. In the first method, referred to as the merge method, the jobs are first divided into two or more sets based on a predetermined criteria such as whether the processing time or the staging time is longer. Then the jobs in each of the sets are ordered according to another predetermined criteria. Finally, the jobs are scheduled by alternating between the schedules for the sets. In one embodiment, jobs in the set with longer processing times are ordered according to a longest processing time first criteria, while the jobs in the set with longer staging times are ordered according to a longest staging time first criteria.

Thus, in accordance with the invention, the final ordering of jobs will be either: a) the job with the longest processing time from among those jobs with longer processing times than staging times, followed by the job with the longest staging time from among those jobs with longer staging times than processing times, followed by the job with the second longest processing time from among those jobs with longer processing times than staging times, etc.; or b) the job with the longest staging time from among those jobs with longer staging times than processing times; followed by the job with the longest processing time from among those jobs with longer processing times than staging times, followed by the job with the second longest staging time from among those jobs with longer staging times than processing times; etc.

The second method, referred to herein as reverse method, again divides the jobs into two or more sets based on a predetermined criteria such as whether the processing time or the staging time is longer. Then the jobs in each set are sorted using some predetermined criteria, and the resulting schedules are ordered. For example, the jobs in the set with longer staging times than processing times are ordered by shortest staging time first while the jobs with the longer processing times than staging times are ordered by longest processing time first. The schedule for the jobs with longer processing times is then appended to the schedule for the jobs with longer staging times; this is called the Reverse Johnson method.

The third method, referred to as the fold method, initially orders the jobs by one criteria and schedules jobs from each end of the list in alternating order. The jobs may initially be ordered by longest staging time first or longest processing time first. The jobs are then scheduled from each end of the list, e.g. first, last, second, second-to-last, third, etc. (or last, first, second-to-last, second, etc.).

In a fourth method, the jobs are ordered by the 3-2 Reverse Johnson method (3-2 refers to the reduction of 3 variables—staging time, processing time and destaging time (destaging time is the time required after processing to move the data processed to an appropriate location; in the case of many tape-resident processing jobs, the destaging time is zero since the end result of the processing job is often a small summary which may be stored on a disk rather than tape)—to two variables). In this method, the staging time for each job is set equal to the staging time plus the processing time, while the processing time is set equal to the processing time plus the destaging time. The reverse method is then performed using the new staging and processing time parameters.

BRIEF DESCRIPTION OF THE DRAWINGS

The foregoing and other advantages and features of the invention will become more apparent from the detailed description of the preferred embodiments of the invention given below with reference to the accompanying drawings in which.

DETAILED DESCRIPTION OF THE PREFERRED EMBODIMENTS

The present invention will be illustrated through a description of a method and apparatus for scheduling tape-resident data processing jobs. Numerous specific details, such as use of tape-resident jobs to illustrate the method, are set forth in order to provide a thorough understanding of the present invention. It will be obvious, however, to one skilled in the art that the present invention may take many different forms and that the present invention may be practiced without the specific details set forth herein. Accordingly, the drawings and description herein are to be regarded as illustrative in nature and not as restrictive.

The model for a system on which tape-resident data processing jobs is to be performed has $P \geq 1$ processors, $D \geq 1$ disks, and $T \geq 1$ tape drives. There is parallelism amongst the components, that is, while data is being read into disk from tape (staging), data may also be written to tape from disk (destaging) and/or the processors may be processing the data from disk (processing); this holds provided the data for these processes are disjoint (that is, different jobs do not require the same data at the same time).

The space on the disks and tapes is divided into pages. The disks can hold M pages in total; the tapes can hold a unbounded number of pages. The data are partitioned into files, each of which resides completely on some tape. It is presumed that some placement of (input) files on the tapes is given. All jobs are sequential, that is, they can be processed only on a single processor at any time. Each job has a predetermined set of pages (files) to be read from tape. Each job also has a predetermined set of pages (files) to be written to tape; for each output file, it is presumed that we know the tape to which they must be written. We also presume that there are no data dependencies among jobs (that is, no job requires as input the output from any other job).

The staging time, $s_i$, is the time needed to read the input pages from tape to disk for job i; $p_i$ is the processing time on a single processor; $d_i$ is the destaging time needed to write the output pages from disk to tape; memory size, $m_i$, is the total size of the input and output pages. Estimates of $p_i$'s and $m_i$'s are often available from the application scenario (as is the case in EOSDIS). If such information is not available, it can be determined from profiling the jobs. "Aggregate estimates" of the $s_i$'s and $d_i$'s can be made using the following model:

$s_i = (t_m + t_1)$*number of input tapes accessed+number of input pages/-$t_r$ $d_i = (t_m + t_1)$*number of output tapes accessed+number of output pages/-$t_r$ where $t_m$ is the average time to mount the desired tape, $t_1$ is the average time to seek within the tape, and $t_r$ is the tape transfer rate.

It may be presumed that jobs may only be processed after all their input data is on disk; thus staging completely precedes processing. This simplifies the situation considerably, for example, a job with little processing, once started, will not be preempted during its execution because of the data being unavailable due to a slow tape. Similarly, output data from disk may be written onto tape only after all the processing is complete; thus, processing completely precedes destaging. It is also presumed that all the disk space needed for both staging and destaging is set aside for jobs a priori; this simplifies the memory management. Furthermore, jobs may not be preempted during any one of the three stages, that is, once staging/processing/destaging is begun, it has to be completed without interruption.

A data processing system has P processors, D disks of total capacity M pages, and T tape drives. A batch of n jobs must be performed off line. Job i has staging time $s_i$, processing time $p_i$, destaging time $d_i$, and total memory requirement of $m_i$ pages; all these parameters are known. For each job, all of the staging must be completed before processing begins, and all of the processing must be completed before destaging begins. Jobs may not be preempted during any one of these three stages. Job i must have $m_i$ pages of the disk must be allocated to it from the beginning of its staging to the completion of its destaging. The goal is to schedule the batch of jobs so as to minimize the completion time of the last job; this is the well known makespan metric in the scheduling literature. Thus, the goal is to obtain simple, efficient algorithms for finding a schedule that minimizes the makespan.

The scheduling problem may be studied in increasing generality as follows:

First, the case when there is a single disk, a single processor, and a single tape drive, and the jobs have only staging and processing times (that is, $d_i=0$ for all jobs i) are considered. This case is of independent interest because often "aggregate" jobs process data to generate a small amount of summary data which may be stored on disk, thus destaging is not needed.

Then the case when there is a single disk, a single processor, and a single tape, and the jobs have arbitrary destaging times is considered. This captures the general scenario when jobs have arbitrarily large output files which have to be archived, that is, stored on tape.

Next, the foregoing is extended to the most general scenario with multiple processors, multiple disks, and multiple tape drives.

There is a connection between these scheduling problems and classical shop scheduling problems in Scheduling Theory. Our particular interest lies in flow-shop scheduling where we have a shop of k "machines" in a sequence. We are given a batch of jobs each of which has to be processed through each of the machines in the same sequence as they appear in the shop; the amount of processing a job needed on different machines may be different. The goal is to determine a schedule that minimizes the makespan of the given batch of jobs.

Consider the first case above of our problem when $P=D=T=1$ and $d_i=0$ for all i. The tape system can be modeled as one "machine" and the processor as the second "machine". Then each job has processing time on the first machine, namely, $s_i$, and that on the second machine, namely, $p_i$. This is the flow-shop scheduling problem with two machines. However, in this case, the jobs have to reside on the disk while being serviced in either machines and the disk has limited capacity M. This corresponds to a variant of flow-shop scheduling where there is a limited storage M in the shop. This flow-shop scheduling problem with two machines and limited storage appears to be novel.

The case when $P=D=T=1$ with arbitrary job destaging times also turns out to be a flow-shop scheduling problem. The first machine is the driver that transfers data from tape to disk, the second machine is the processor, and the third machine is the driver that transfer data from disk to tape. Thus this is a flow-shop problem with three machines, again with limited storage. This problem too is novel.

The general case with P processors and T tape drives is less readily seen as a flow-shop problem. One may consider the driver transferring data from tape to disk as one machine, and that from disk to tape as another, and the processor scheduler as the third. Therefore, the first and third machines have additional resource constraints, namely, the number T of tape drives and P of processors respectively. Thus the problem is this generalization of flow-shop scheduling with limited storage and additional resource constraints; here, this problem is reduced heuristically to one without any additional resource constraints as explained further below.

Flow-shop scheduling problems have been intensely studied in the Operation Research and Algorithms communities. Many variants including ones that have setup or removal costs at each machine have been studied. A version closely related to this one is the one in which there is a bound on the number of jobs that may be in the shop at any time (see Papadimitriou and Kanellakis, "Flow shop Scheduling With Bounded Buffers," unpublished manuscript cited in Garey and Johnson, Computers and Intractability: a Guide to the theory of NP-Completeness, Freeman 1979). The present formulation is more general. Although many results exist on scheduling parallel processors and database queries with additional resource constraints, flow-shop problems with limited storage and resource constraints have not been studied before. Also, the present problem may be thought of as a special packet routing problem on a network of three nodes with bounded queue at each node. No relevant results exist for this special version.

Consider the case when $P=D=T=1$ and $d_i=0$ for all i. As discussed above, this is the 2-machine flow-shop scheduling problem with storage being bounded by M. The "processing time" on the first machine is $s_i$ and that on the second machine is $p_i$, for each job i. Define $m=\max_i m_i$, the maximum memory requirement of any job. The complexity of the problem depends on the relative sizes of m and M.

An optimal algorithm is known for this problem provided there is no storage bound in the shop, that is, M is unbounded or $M/m=\infty$. Let $P=\{i|s_i<p_i\}$, and $S=\{i|s_i>p_i\}$. The algorithm is to schedule the jobs in P by Shortest Staging Time First (SSF) followed by those in S by Longest Processing Time First (LPF). This algorithm has the optimal makespan. This algorithm is referred to herein as Johnson's algorithm. For more details please see Johnson, Optimal Two- and Three-Stage Production Schedules with Setup Times Included, in Naval Research Logistics Quarterly 1,1 (March 1954), pp. 61–68.

It has been discovered that Johnson's algorithm is not optimal when the shop has a storage bound $M \leq cm$ for any positive constant c.

The 2-machine flow-shop problem with limited storage is NP hard since the special case of it in which there is a bound on the number of jobs is known to be NP hard. This is interesting since, in contrast, the 2-machine flow-shop scheduling problem has an optimal algorithm without storage bound, namely, Johnson's algorithm. This application focuses on providing fast approximate algorithms for flow-shop scheduling with storage bounds. In what follows, it is presumed that the storage bound M is at least $2 \max_i m_i$; this is very reasonable.

It has also been discovered that considering any instance of the 2-machine flow-shop scheduling problem with storage bound $M \geq 2 \max_i m_i$ and n jobs each of which satisfies $s_i \leq p_i$; say OPT is the optimum makespan. There exists an O(n log n) algorithm to find a schedule with makespan at most $$OPT + \max_i s_i - \min_i s_i.$$

Note that typically, one would expect $\max_i s_i - \min_i s_i$ to be substantially smaller than $\Sigma_i s_i$, or $\Sigma_i p_i$, and hence OPT. In particular, if $\max_i s_i \leq 1/4 \Sigma_i s_i$, then LSF is a 5/4 approximation to the problem. This is a good approximation, and if the staging times are less skewed (say, $\max_i s_i \leq \epsilon \Sigma_i s_i$), the approximation is even better (e.g., $1+\epsilon$). Henceforth a "good approximation" means a result of the type described above.

For the set S (that is, all i such that $s_i \leq p_i$), we employ (again surprisingly in contrast with Johnson's algorithm) SSF. It can shown that the makespan of SSF is at most $OPT + \max_i p_i - \min_i p_i$. This too is a good approximation. If $s_i = p_i$ for each i, then any sequence in which the jobs are executed is optimal independent of the individual memory requirements; this is proved by induction.

The case considered here is one where P=D T=1, but jobs have arbitrary destaging times. As mentioned earlier, this is the 3-machine flow-shop scheduling problem with storage bound M. Since the 2-machine version is NP hard, so is the 3-machine version. Finding efficient approximation algorithms is the focus. Throughout, it shall be assumed that $M \geq 2 \max_i m_i$, recall that $m_i$ is the total (input and output) memory requirement for job i. Say the jobs are processed in order 1,2, . . . ,n. Define $s_{n+1}=d_o=0$. Let $C^S_{max}$ be the makespan for a schedule S. For any schedule S, we have:

$$C^S_{max} \leq s_1 + \sum_{i=1}^{n} \max(s_{i+1} - p_i, d_{i-1} - p_i, 0) + \sum_{i=1}^{n} p_i + d_n.$$

The following can be shown: (1) If $s_i \geq p_i$ and $s_i \geq d_i$ for all i, the makespan attained by SSF is $C^S_{max} \leq \Sigma s_i + \max(d_{n-1}, p_n) + d_n$. Since $OPT \geq \Sigma s_i + d_n$, SSF is a good approximation. (2) If $s_i \leq d_i$ and $p_i < d_i$ for all i, the makespan attained by SDF (Shortest Destaging Time First) is $C^S_{max} \leq s_1 + \max(s_2, p_1) + \Sigma d_i$; since $OPT \geq s_1 + \Sigma d_i$, this is a good approximation. (3) If $s_i = p_i = d_i$ for all i, the optimal makespan is $\max_i s_i + \Sigma_i p_i + \max_i d_i$ and that is achieved by, for example, LPF (Longest Processing Time First). (4) Let $s_i = p_i \leq d_i$ for all i. Let S be the schedule resulting from LPF and S' resulting from SPF. If $p_i \leq d_i + 1$, we have $C^S_{max} = C^{S'}_{max} = \max_i s_i + \Sigma_i p_{i+mini} d_i$. Similar analyses can be performed and appropriate orders found to execute jobs in various other categories.

Now consider the general version of the scheduling problem with multiple processors, disks, and tape drives. Multiple processors and disks allow processing multiple jobs at once, and multiple disks and tape drives allow for parallel staging and parallel destaging.

As mentioned earlier, this general problem may be thought of as 3-machine flow-shop scheduling with limited storage and additional resource constraints. This problem is clearly NP hard. In general, scheduling problems with additional resource constraints do not have small constant factor approximations. We propose the simple algorithmic approach of solving the P=D=T=1 version of the problem and simulating the order of job execution in parallel for the general case. Although this approach of simulating the sequential schedule with multiple machines is a provably good approximation in some cases, we have no provable guarantees in our case. However, the resulting algorithms are appealingly simple and they seem to perform well.

The first method of the present invention will be referred to herein as the merge method. The merge method creates two sets P and S, and then independently determines schedules for them based on a predetermined criteria such as whether the processing time or the staging time is longer (P is the subset of jobs with processing time longer than staging time, while S is the subset of those jobs with staging time longer than or equal to processing time), and creates an ordering of jobs that alternates between those for P and S. In a preferred embodiment of this method, P is ordered by LPF (longest processing time first) and S is ordered by LSF (longest staging time first).

Figure 1:
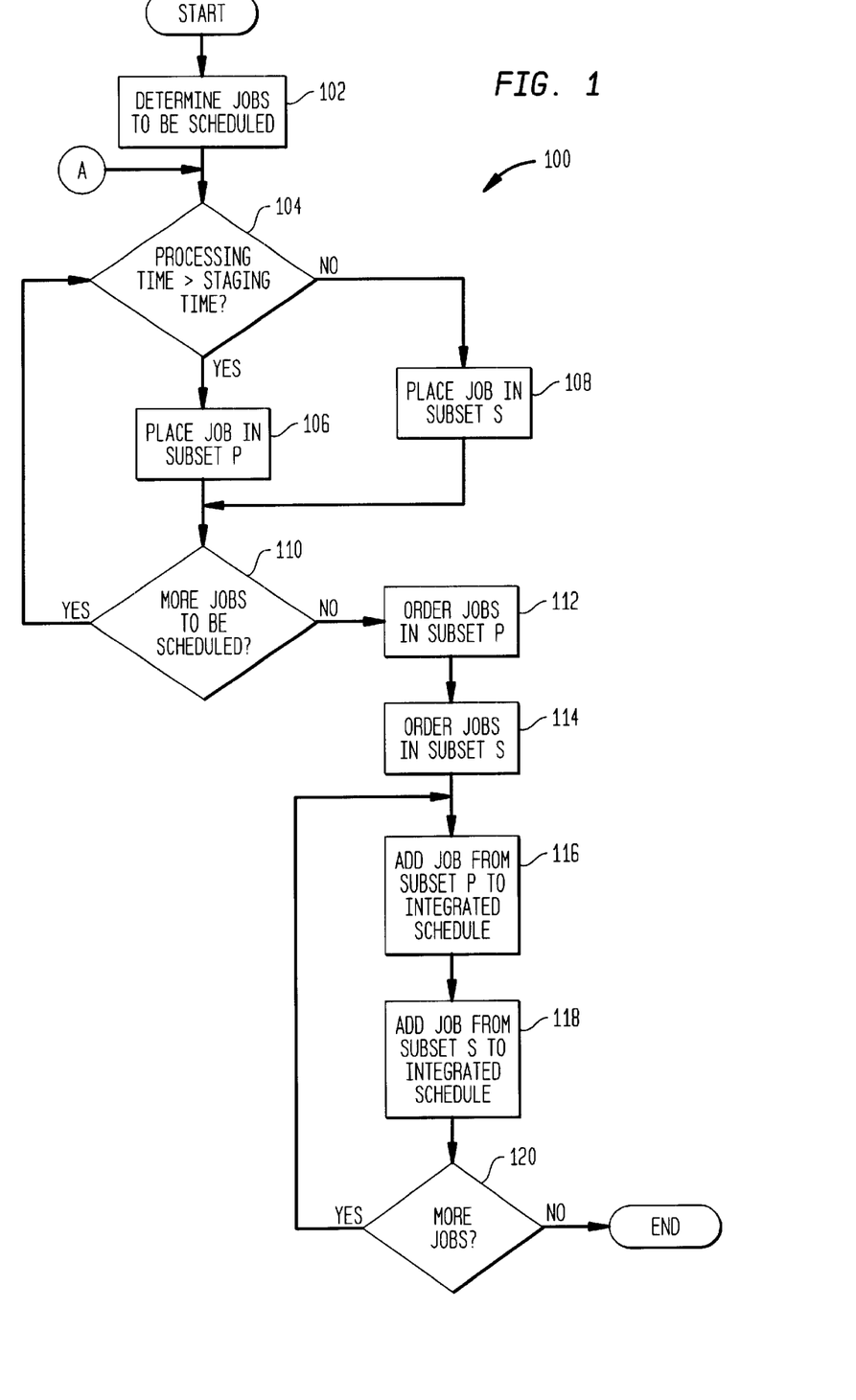
FIG. 1 is a flowchart illustrating an exemplary merge method.

One example of the merge method is illustrated in the flowchart 100 of FIG. 1. The jobs to be scheduled are determined at step 102. The processing and staging times for each job are compared at step 104. If the processing time is greater than the staging time for a particular job, that job is placed in a subset (i.e., a group) P at step 106; otherwise, the job is placed in subset S at step 108. If more jobs are to be scheduled at step 110, steps 104, 106, 108, 110 are repeated. If there are no more jobs to be scheduled at step 110, the jobs in subsets P and S are ordered at steps 112 and 114, respectively. In a preferred embodiment, as discussed above, the jobs in subset P are ordered by LPF, while those in subset S are ordered by LSF. After the subsets S and P have been ordered, an integrated schedule is created by adding the first job in subset P to the integrated schedule at step 116, followed by the first job in subset S at step 118. As the jobs from the subsets S and P are added to the integrated schedule, they are deleted from their respective subsets. If more jobs are to be scheduled (meaning that one or both of the subsets is not yet empty) at step 120, steps 116 and 118 are repeated until both subsets are empty, which means that all jobs have been scheduled. The scheduled jobs are then ready for execution.

It should be noted that it is likely that one of the subsets (S or P) will have more jobs; thus, as the jobs are added to the integrated list, either step 116 or 118 will be a null step depending upon which subset list is longer. Those of skill in the art will recognize that, upon reaching the end of one of the subsets, the remaining subset could simply be appended to the integrated schedule. It should also be noted that the integrated list could be started with a member from subset S rather than subset P if desired. In addition, it is possible to split the jobs into n>1 sets based on a predetermined criteria (as opposed to merely the two sets illustrated in FIG. 1). The n>1 sets would then be merged as described above.

The second method of the present invention is referred to herein as the reverse method. In this method, the jobs are once again separated into subsets based on a predetermined criteria such as whether the jobs having longer staging times or scheduling times. The jobs in each set are then sorted, and the sorted lists are appended together.

Figure 2:
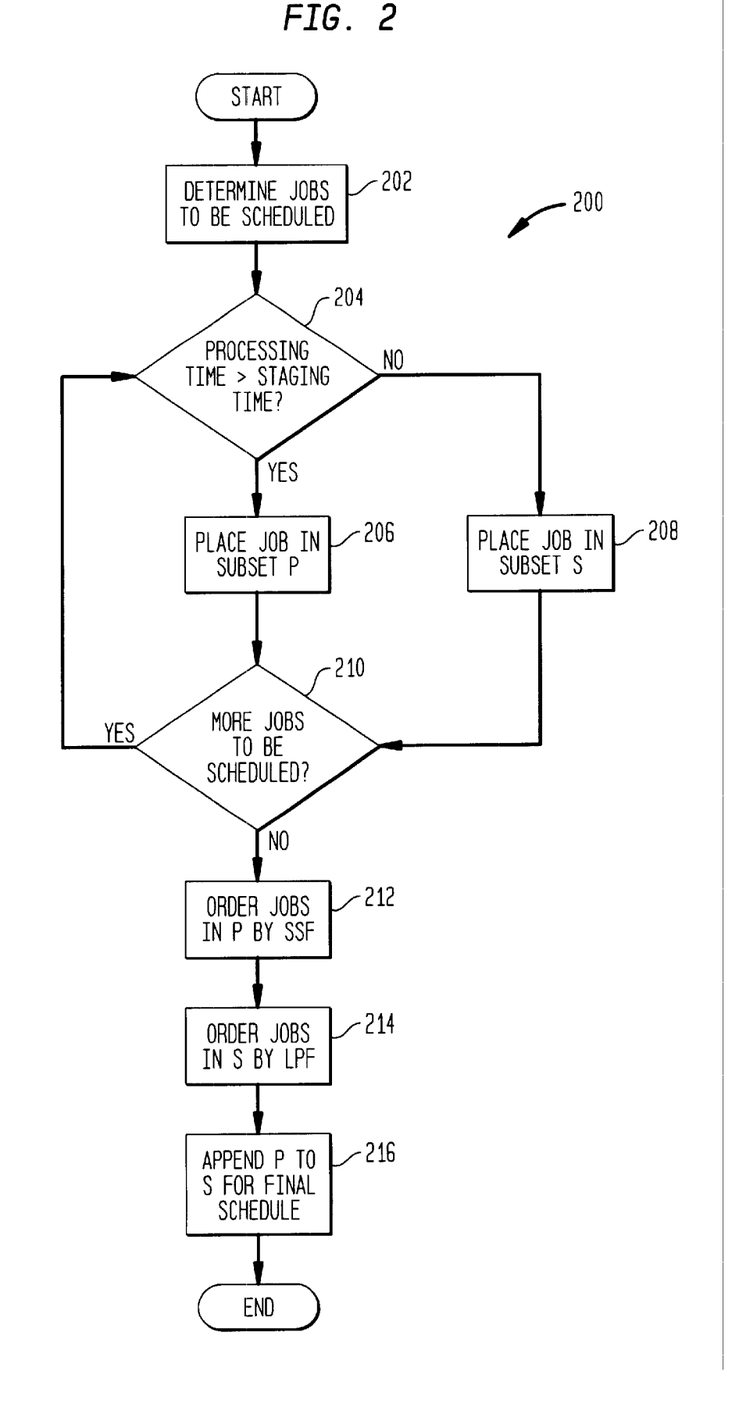
FIG. 2 is a flowchart illustrating an exemplary reverse method.

One example of the reverse method is illustrated in the flowchart 200 of FIG. 2. In this case, the jobs will be split into subsets P and S. The jobs in subset P are sorted by SSF (shortest staging time first) while those in S are sorted by LPF (longest processing time first). The sorted list for P is then appended to the sorted list for S for the final schedule. The jobs to be scheduled are determined at step 202. The processing and staging times for each job are compared at step 204. If the processing time is greater than the staging time for a particular job, that job is placed in a subset P at step 206; otherwise, the job is placed in subset S at step 208. If more jobs are to be scheduled at step 210, steps 204, 206, 208, 210 are repeated. If there are no more jobs to be scheduled at step 210, the jobs in subset P are ordered by SSF at step 212 and the jobs in subset S are ordered by LPF at step 214. After the subsets S and P have been ordered, an integrated schedule is created by appending the list of jobs in subset P to the list of jobs in subset S at step 216. The scheduling is then complete and the jobs are ready for execution. It should be noted that it is possible to split the jobs into n>1 sets based on a predetermined criteria (as opposed to merely the two subsets illustrated in FIG. 2). The n>1 sets would then be scheduled as described above.

The third method is referred to herein as the fold method. In an exemplary embodiment, the fold method sorts the jobs by either LPF (referred to as Fold LPF) or LSF (referred to as Fold LSF) and orders the jobs from both ends of the sorted list simultaneously, but alternating between the two ends.

Figure 3:
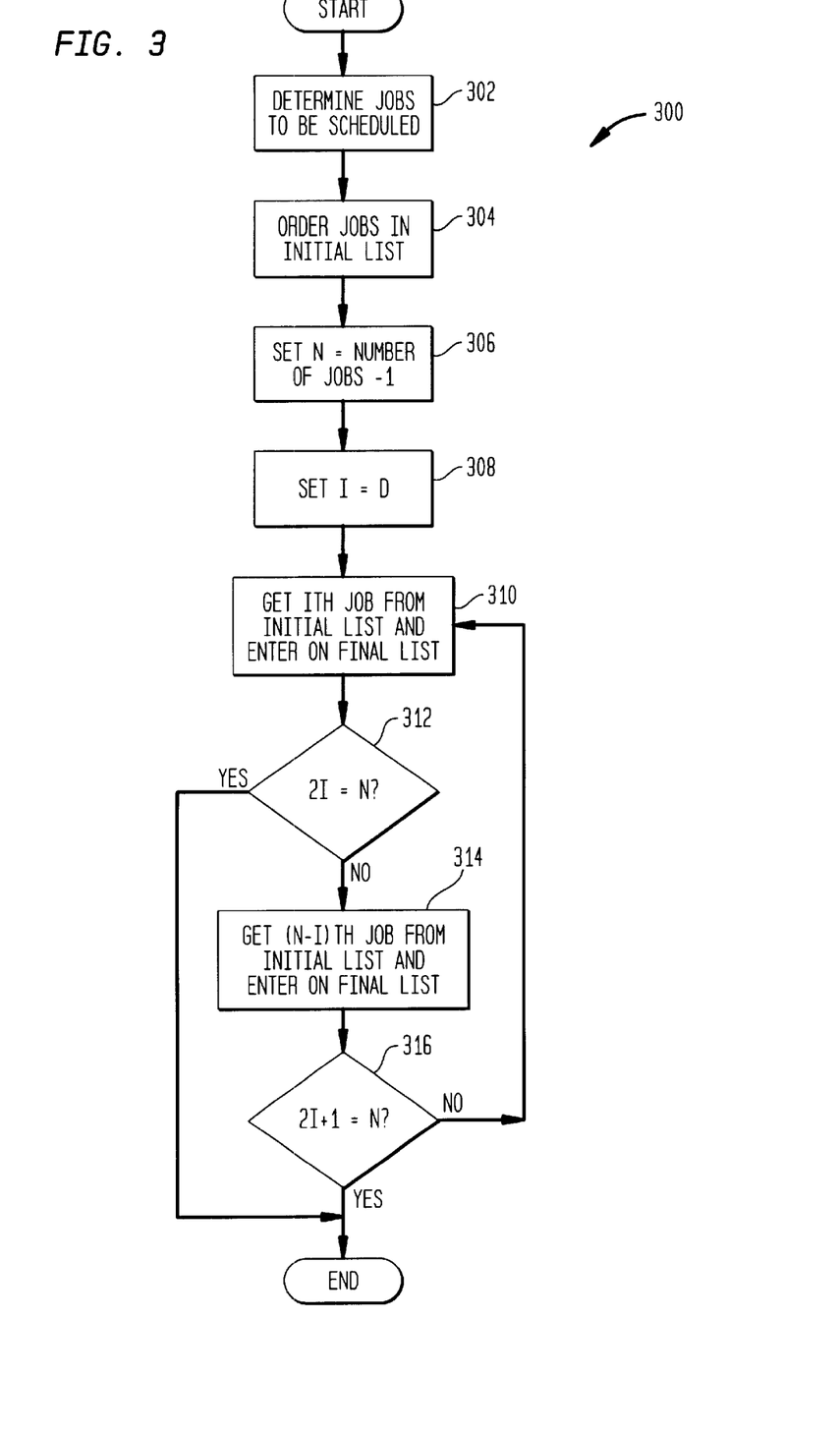
FIG. 3 is a flowchart illustrating an exemplary fold method.

An example of the fold method is illustrated in the flowchart 300 of FIG. 3. The jobs to be scheduled are determined at step 302. The jobs are ordered in an initial list at step 304. This initial ordering may be LPF or LSF as discussed above. A variable N is set to the number of jobs minus 1 at step 306. In other words, if 10 jobs are to be performed, N is set to 9. An index I is initialized to 0 at step 308. The Ith entry from the initial list is entered onto a final list (the final list is the list with the jobs to be performed in the desired order) at step 310. Next, the index I is checked to determine whether all jobs have been scheduled. This check is made by determining whether 2*I=N at step 312. If it is, all jobs have been scheduled and are ready for execution. If 2*I is not equal to N at step 312, the (N−I)th job is taken from the initial list and entered on the final list at step 314. A second check is then made at step 316 to determine whether all jobs have been scheduled. If (2*I)+1=N, then all jobs have been scheduled and are ready for execution; otherwise, steps 310, 312, 314, 316 are repeated. It should be noted that it is possible to split the jobs into n>1 sets based on a predetermined criteria (as opposed to merely the two subsets illustrated in FIG. 3). The n>1 sets would then be scheduled as described above.

The merge, flow, and reverse methods are heuristics for the 3-machine problem. There is also a new heuristic for the 3-machine problem, based on a standard approach of reducing the 3-machine flow-shop problem to an instance of 2-machine problem by setting $S_i=s_i+p_i$ and $P_i=p_i+d_i$. The Reverse Johnson algorithm is then used to schedule the jobs. This method is referred to as the 3-2 Reverse Johnson method.

Figure 4:
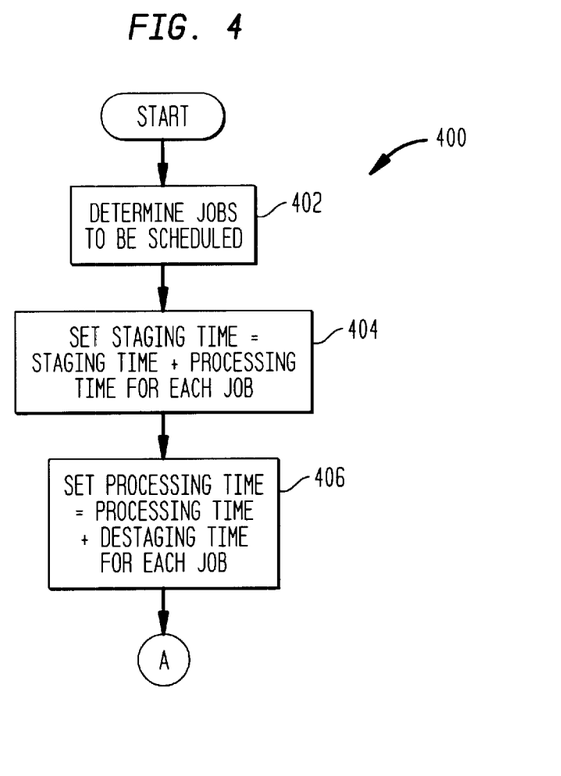
FIG. 4 is a flowchart illustrating the 3-2 Reverse Johnson method.

An example of the 3-2 Reverse Johnson method is illustrated by the flowchart 400 of FIG. 4. The jobs to be scheduled are determined at step 402. For each job to be scheduled, the staging time is set equal to the staging time plus the processing time at step 404. Then the processing time is set equal to the processing time plus the destaging time at step 406. Execution then continues (with the modified processing and staging times) at point A on flowchart 100 of FIG. 1.

For a given scheduling strategy, we may improve the schedule using patching. This happens when instead of idling during any stage by executing the given scheduling strategy, an out-of-sequence job is scheduled to fill the "gap" provided resources are available. Patching may be used to improve the performance of any of the methods discussed above.

Figure 5:
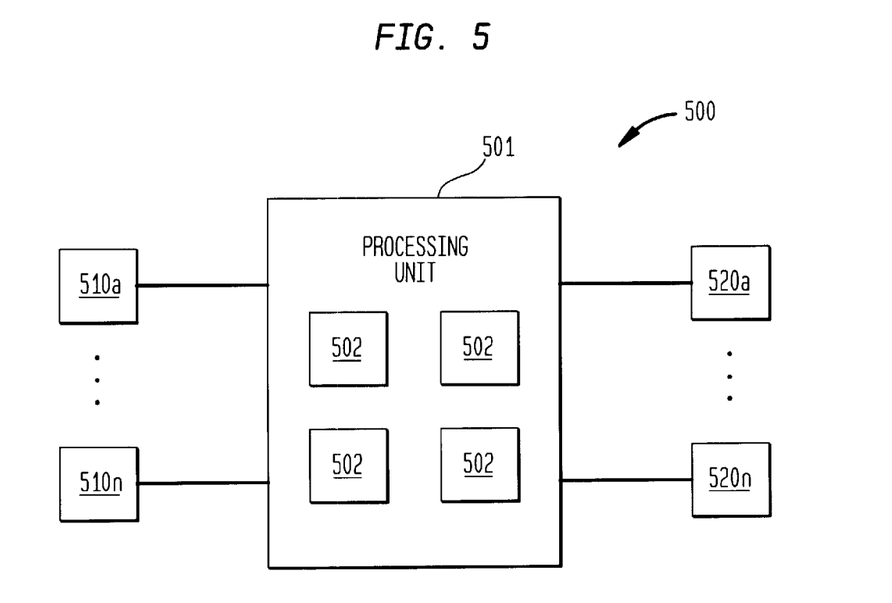
FIG. 5 is a block diagram illustrating an exemplary data processing system for and/or on which one of the algorithms illustrated in FIGS. 1 to 4 may be used to schedule data processing jobs.

FIG. 5 is a block diagram illustrating an exemplary system 500 on which the aforementioned methods (illustrated in FIGS. 1 to 4) may be used to schedule and perform tape-resident jobs. The system 500 includes a processing unit 501 with at least one processor 502 (multiple processors are shown in FIG. 5). The processor may be a general purpose processor, hard-wired logic, a microprocessor, a digital signal processor, or any other type of processor. Connected to the processing unit 501 are at least one tape drive 510 and at least one disk drive 520 (multiple tape and disk drives are shown in FIG. 5). Data is staged by retrieving it from the tape drive 510 and writing it to a disk drive 520. The data is then processed by one of the processors 502. The resultant data (such as a listing of results of the processing), which is written to a disk 510 (which may or may not be the same disk 510 on which the data is staged) during processing, is destaged by copying it to a tape drive 520 (which again may or may not be the same tape drive from which the raw data was received).

Several solutions to a common problem in processing massive data sets that reside on tapes, namely, efficiently processing batches of tape-resident jobs, have been set forth. The motivating application was the EOSDIS system, but the problem addressed herein arises in many other scenarios. These solutions may be used for scheduling a wide variety of jobs with non-trivial staging, processing and destaging times.

Methods for finding the sequence in which a batch of tape-resident jobs must be executed in order to minimize the makespan are presented herein. The approach is to reduce the general scheduling problem to a novel variant of flow-shop problem with two or three machines. This variant is harder than the standard flow-shop problem, but near-optimal algorithms are presented. Experiments with real (EOS, high energy physics) and simulated data show this approach to be very effective, improving over straightforward schedules by as much an 15%, or about 29 hours in a EOS batch.

While the invention has been described in detail in connection with the preferred embodiments known at the time, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Accordingly, the invention is not to be seen as limited by the foregoing description, but is only limited by the scope of the appended claims.

What is claimed as new and desired to be protected by Letters Patent of the United States is:

1. A method for scheduling a batch of data processing jobs, each job having a staging time, a processing time, and a destaging time, said method comprising the steps of:

dividing the data processing jobs to be scheduled into a first subset of data processing jobs having processing times longer than their respective staging times and a second subset of data processing jobs having staging times longer than their respective processing times, the staging times defining the time required to transfer data from a sequential access storage device to a random access storage device, the processing times defining the time necessary to complete the operations associated with the data processing job by the processor, and the destaging times defining the time necessary to move the processed data from the random access storage device to the sequential access storage device;

independently ordering the data processing jobs in the first and second subsets wherein the first subset is ordered by longest processing time first and the second subset is ordered by longest staging time first;

creating an integrated schedule of sequenced data processing jobs by alternatively selecting jobs in order from the first and second subsets.

2. The method of claim 1, wherein the creating step is performed by selecting a job from the first subset first.

3. The method of claim 1, wherein the creating step is performed by selecting a data processing job from the second subset first.

4. The method of claim 1, wherein the sequential access medium is a tape and the random access medium is a disk.

5. The method of claim 1, further comprising the step of scheduling an out-of-sequence data processing job.

6. A method for scheduling a batch of data processing jobs having staging times, processing times, and destaging times, the staging times defining the time required to transfer data from a sequential access storage device to a random access storage device, the processing times defining the time necessary to complete the operations associated with the data processing job by the processor, and the destaging times defining the time necessary to move the processed data from the random access storage device to the sequential access storage device, said method comprising the steps of:

dividing the data processing jobs to be scheduled into at least two subsets of data processing jobs based upon a predetermined criteria;

independently ordering the data processing jobs in the at least two subsets;

creating an integrated schedule of sequenced data processing jobs by alternately choosing from each of the at least two subsets.

7. The method of claim 6, wherein the at least two subsets comprises a first subset of data processing jobs having their respective processing times longer than their respective staging times and a second subset of data processing jobs having their respective staging times longer than their respective processing times, wherein the predetermined criteria comprises a rule which compares processing time with the staging time of each data processing job to determine whether to place the data processing job into either the first subset of data processing jobs or the second subset of data processing jobs.

8. A method for scheduling a batch of data processing jobs having staging, processing times, and destaging times, said method comprising the steps of:

dividing the batched data processing jobs to be scheduled into a first subset of data processing jobs with processing times longer than their respective staging times and a second subset of data processing jobs with staging times longer than their respective processing times, the staging times defining the time required to transfer data from a sequential access storage device to a random access storage device, the processing times defining the time necessary to complete the operations associated with the data processing job by the processor, the destaging times defining the time necessary to move the processed data from the random access storage device to the sequential access storage device;

ordering the data processing jobs in the fist subset by shortest staging time first;

ordering the data processing jobs in the second subset by longest processing time first;

creating an integrated schedule of sequenced data processing jobs by appending the first subset of data processing jobs to the second subset of data processing jobs.

9. The method of claim 8, wherein the sequential access storage medium is a tape and the random access storage medium is a disk.

10. The method of claim 8, further comprising the step of scheduling an out-of-sequence job.

11. A method for scheduling a batch of data processing jobs having staging times, processing times, and destaging times, the staging times defining the time required to transfer data from a sequential access storage device to a random access storage device, the processing times defining the time necessary to complete the operations associated with the data processing job by the processor, and the destaging times defining the time necessary to move the processed data from the random access storage device to the sequential access storage device, said method comprising the steps of:

dividing the data processing jobs to be scheduled into at least two subsets of data processing jobs based on a predetermined criteria;

independently ordering the data processing jobs in the at least two subsets;

creating an integrated schedule of the data processing jobs by appending each of the at least two subsets to each other.

12. The method of claim 11, wherein the at least two subsets comprises a first subset of data processing jobs having their processing times longer than their respective staging times and a second subset of data processing jobs having their staging times longer than their respective processing times, wherein the predetermined criteria comprises a rule which compares processing time with the staging time of each data processing jobs to determine whether to place the data processing job into either the first subset of data processing jobs or the second subset of data processing jobs.

13. The method of claim 11, wherein said step of independently ordering the jobs in the at least two subsets comprises:

ordering the jobs in a first subset by shortest staging time first; and ordering the jobs in a second subset by longest processing time first.

14. A method for scheduling a batch of data processing jobs having staging times, processing times, and destaging times, the staging times defining the time required to transfer data from a sequential access storage device to a random access storage device, the processing times defining the time necessary to complete the operations associated with the data processing job by the processor, and the destaging times defining the time necessary to move the processed data from the random access storage device to the sequential access storage device, said method comprising the steps of:

ordering the data processing jobs in a list having a first end and a second end according to a predetermined criterion; and creating an integrated schedule of data processing jobs by alternately selecting data processing jobs from the first end and the second end of the list.

15. The method of claim 14, wherein the predetermined criterion is longest processing time first.

16. The method of claim 14, wherein the predetermined criterion is longest staging time first.

17. The method of claim 14, wherein a job from the first end is selected first.

18. The method of claim 14, wherein a job from the second end is selected first.

19. The method of claim 14, the sequential access storage medium is a tape and the random access storage medium is a disk.

20. The method of claim 14, further comprising the step of scheduling an out-of-sequence job.

21. A method for scheduling a batch of data processing jobs having staging times, processing times, and destaging times comprising the steps of:

setting the staging time for each data processing job equal to the staging time plus the processing time, the staging times defining the time required to transfer data from a sequential access storage device to a random access storage device, the processing times defining the time necessary to complete the operations associated with the data processing job by the processor;

setting the processing time for each data processing job equal to the processing time plus the destaging time, the destaging times defining the time necessary to move the processed data from the random access storage device to the sequential access storage device;

dividing the data processing jobs to be scheduled into a first subset of data processing jobs with processing times longer than respective staging times and a second subset of data processing jobs with staging times longer than respective processing times;

ordering the data processing jobs in the first subset by shortest staging time first;

ordering the data processing jobs in the second subset by longest processing time first;

creating an integrated schedule of the data processing jobs by appending the first subset of data processing jobs to the second subset of data processing jobs.

22. The method of claim 21, wherein the sequential access storage medium is a tape and the random access storage medium is a disk prior to processing; and the destaging time is the time required to move the data from disk to tape after processing.

23. A system for performing a batch of data processing jobs comprising:

a sequential access storage device;

a random access storage device; and a processor connected to the random access storage device and the sequential access storage device;

wherein the processor is programmed to schedule the data processing jobs having staging times defining the time required to transfer data from the sequential access storage device to a random access storage device, processing times defining the time necessary to complete the operations associated with the data processing job by the processor, and destaging times defining the time necessary to move the processed data from the random access storage device to the sequential access storage device by performing the steps of:

dividing the data processing jobs to be scheduled into a first subset of data processing jobs with processing times longer than respective staging times and a second subset of data processing jobs with staging times longer than or equal to respective processing times;

independently ordering the data processing jobs in the first and second subsets;

creating an integrated schedule of the data processing jobs by alternatively selecting data processing jobs in order from the first and second subsets.

24. The system of claim 23, wherein the sequential access storage device is a tape drive.

25. The system of claim 23, wherein the random access storage device is a disk drive.

26. A system for performing data processing jobs comprising:

a sequential access storage device;

a random access storage device; and a processor connected to the random access storage device and the sequential access storage device;

wherein the processor is programmed to schedule the data processing jobs having staging times defining the time required to transfer data from the sequential access storage device to a random access storage device, processing times defining the time necessary to complete the operations associated with the data processing job by the processor, and destaging times defining the time necessary to move the processed data from the random access storage device to the sequential access storage device by performing steps of:

dividing the data processing jobs to be scheduled into at least two subsets of data processing jobs based on a predetermined criteria;

independently ordering the data processing jobs in the at least two subsets;

creating a schedule of the data processing jobs by appending each of the at least two subset of data processing jobs to each other.

27. The system of claim 26, wherein a number of subsets is two and the predetermined criteria comprises a first subset of jobs with processing times longer than respective staging times and a second subset of jobs with staging times longer than respective processing times.

28. A system for performing a batch of data processing jobs comprising:

a sequential access storage device;

a random access storage device; and a processor connected to the random access storage device and the sequential access storage device;

wherein the processor is programmed to schedule the data processing jobs having staging times defining the time required to transfer data from the sequential access storage device to a random access storage device, processing times defining the time necessary to complete the operations associated with the data processing job by the processor, and destaging times defining the time necessary to move the processed data from the random access storage device to the sequential access storage device by performing steps of:

ordering the data processing jobs in a list having a first end and a second end according to a predetermined criterion; and creating a schedule of the data processing jobs by alternately selecting jobs from the first end and the second end of the list.

29. A system for performing a batch of data processing jobs comprising:

a sequential access storage device;

a random access storage device; and a processor connected to the random access storage device and the sequential access storage device;

wherein the processor is programmed to schedule the data processing jobs jobs having staging times defining the time required to transfer data from the sequential access storage device to a random access storage device, processing times defining the time necessary to complete the operations associated with the data processing job by the processor, and destaging times defining the time necessary to move the processed data from the random access storage device to the sequential access storage device by performing steps of:

setting the staging time for each data processing job equal to the staging time plus the processing time;

setting the processing time for each data processing job equal to the processing time plus the destaging time;

dividing the data processing jobs to be scheduled into a first subset of data processing jobs with processing times longer than respective staging times and a second subset of data processing jobs with staging times longer than respective processing times;

ordering the data processing jobs in the first subset by shortest staging time first;

ordering the data processing jobs in the second subset by longest processing time first;

creating a schedule of the data processing jobs by appending the first subset of data processing jobs to the second subset of data processing jobs.

* * * * *